United States Patent
Wesstrom et al.

(10) Patent No.: US 11,143,239 B2
(45) Date of Patent: Oct. 12, 2021

(54) CHAIN SLIDER

(71) Applicant: Mountain Productions, Inc., Wilkes-Barre, PA (US)

(72) Inventors: Martin Wesstrom, Ashley, PA (US); Richard A. Rose, III, Palm Beach Gardens, FL (US); Ronald Joseph Rose, Palm Beach Gardens, FL (US)

(73) Assignee: Mountain Productions, Inc., Wilkes-Barre, PA (US)

( * ) Notice: Subject to any disclaimer, the term of this patent is extended or adjusted under 35 U.S.C. 154(b) by 0 days.

(21) Appl. No.: 16/192,583

(22) Filed: Nov. 15, 2018

(65) Prior Publication Data

US 2019/0145460 A1 May 16, 2019

Related U.S. Application Data

(60) Provisional application No. 62/586,862, filed on Nov. 15, 2017.

(51) Int. Cl.
| | | |
|---|---|---|
| *A47H 5/00* | (2006.01) | |
| *F16C 33/04* | (2006.01) | |
| *F16M 13/02* | (2006.01) | |
| *F16C 33/20* | (2006.01) | |
| *F16C 29/02* | (2006.01) | |
| *H02G 11/00* | (2006.01) | |
| *H02G 3/04* | (2006.01) | |

(52) U.S. Cl.
CPC ............ *F16C 33/046* (2013.01); *F16C 29/02* (2013.01); *F16C 33/208* (2013.01); *F16M 13/022* (2013.01); *H02G 11/00* (2013.01); *F16C 2208/20* (2013.01); *F16C 2220/04* (2013.01); *H02G 3/0462* (2013.01)

(58) Field of Classification Search
CPC ... F16C 33/046; F16C 33/208; F16M 13/022; F16G 15/06; F16G 15/04; H02G 11/00
USPC ........................ 248/298.1; 403/340, 339, 331
See application file for complete search history.

(56) References Cited

U.S. PATENT DOCUMENTS

| | | | | |
|---|---|---|---|---|
| 8,464,986 B1* | 6/2013 | McClure | ............... | F16B 7/0433 |
| | | | | 248/74.1 |
| 8,801,324 B2* | 8/2014 | Kempf | ..................... | H02G 1/06 |
| | | | | 403/340 |
| 2013/0240684 A1* | 9/2013 | Meyers | ................. | F16L 3/2235 |
| | | | | 248/74.1 |
| 2016/0032961 A1* | 2/2016 | Tanaka | ...................... | F16C 9/02 |
| | | | | 123/192.2 |

\* cited by examiner

*Primary Examiner* — Todd M Epps
(74) *Attorney, Agent, or Firm* — Phillips Lytle LLP; David L. Principe

(57) ABSTRACT

A chain slider is designed as a cable management device, and includes an interchangeable insert system to adapt different size chain, cable wire rope, synthetic rope or line used in hoisting devices. The chain slider may be manufactured of plastic and injection molded to shape.

15 Claims, 5 Drawing Sheets

CHAIN SLIDER

RELATED APPLICATIONS

Not Applicable

STATEMENT REGARDING FEDERALLY SPONSORED RESEARCH OR DEVELOPMENT

Not Applicable

STATEMENT REGARDING PARTIES TO A JOINT RESEARCH AGREEMENT

Not Applicable

REFERENCE TO SEQUENCE LISTING, TABLE, OR COMPUTER PROGRAM LISTING

Not Applicable

STATEMENT REGARDING PRIOR DISCLOSURES BY THE INVENTOR OR A JOINT INVENTOR UNDER 37 C.F.R. 1.77(B)(6)

Not Applicable

TECHNICAL FIELD

This disclosure relates to cable management devices, and particularly to a chain slider.

BACKGROUND ART

The TOURSLIDER™ by Scan-Rig AB and the cable slider by Production Resource Group (as described in U.S. Pat. No. 8,801,324) are examples of existing chain sliders on the market. Current chain sliders are a fixed size with no adjustability. This can be burdensome because staging companies must carry and track multiple sizes of chain sliders. Many chain sliders also require tools for installation or removal. This can be difficult and hazardous when installing or removing chain sliders from significant heights above a stage.

SUMMARY

This disclosure describes a product that is referred to as a chain slider in the entertainment industry. The chain slider is designed as a cable (power, control, data, etc.) management device. One novel feature of this design is an interchangeable insert system that allows the chain slider to adapt different size chain, cable wire rope, and synthetic rope (line) used in hoisting devices. The chain slider includes a body assembly having two matching pieces that connect together without needing any tools. Depending on the number and thickness of cables or chains that are being joined together, the chain slider is configured to mate with removable inserts of varying thicknesses. Such inserts may quickly and easily join to each body assembly section without the use of tools. The chain slider may be manufactured of plastic and injection molded to shape.

Current chain sliders on the market are a fixed size with no adjustability. The inner inserts of the present disclosure allow for adjustability of the inner diameter opening to ensure proper functionality and safety. The present disclosure can otherwise be configured to function in a similar way as current chain sliders on the market. The disclosed chain slider will perform better than current models on the market due to the adjustable inserts that will allow a consumer to adjust inner diameter size in the best way for the specific application.

DESCRIPTION OF THE PREFERRED EMBODIMENTS

Figure 1:
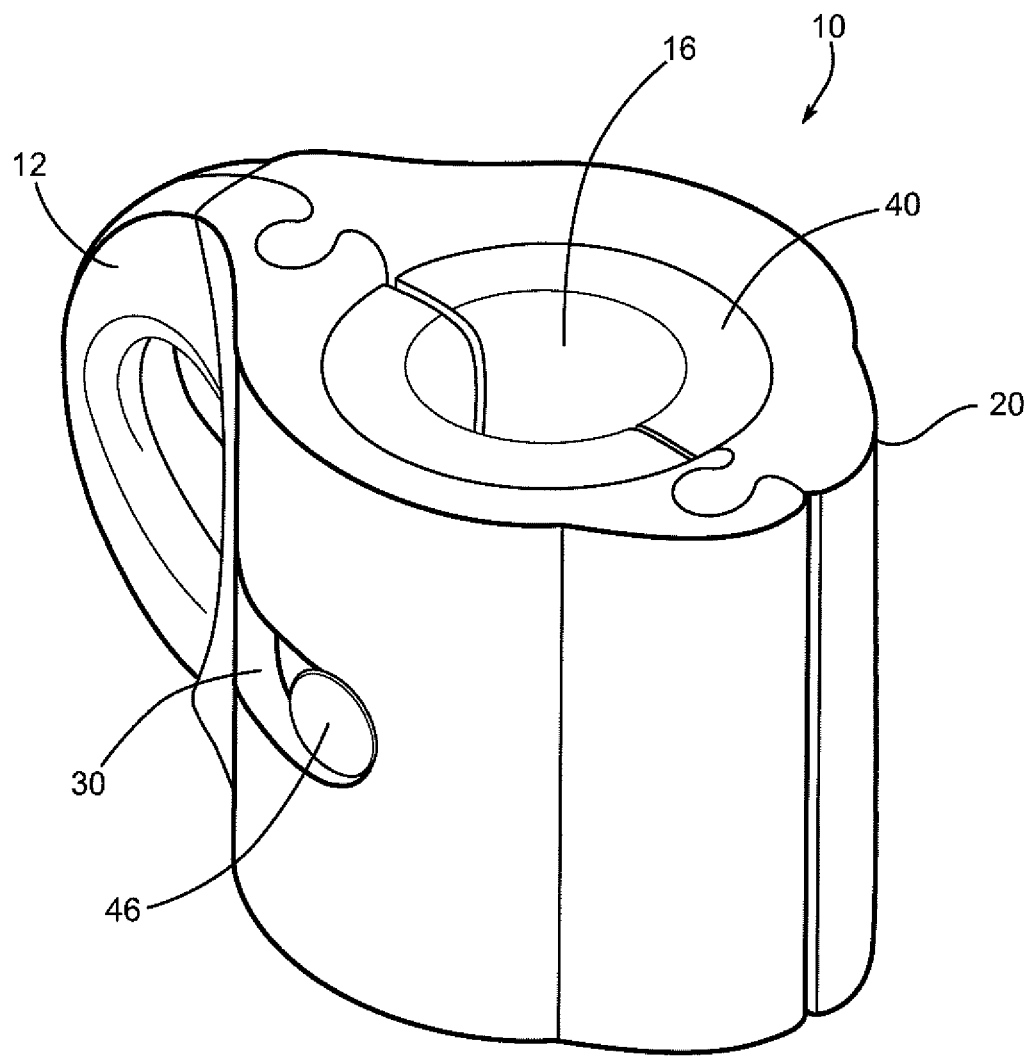
FIG. 1 is the full chain slider assembly, including an insert.

At the outset, it should be clearly understood that like reference numerals are intended to identify the same structural elements, portions or surfaces consistently throughout the several drawing figures, as such elements, portions or surfaces may be further described or explained by the entire written specification, of which this detailed description is an integral part. Unless otherwise indicated, the drawings are intended to be read together with the specification, and are to be considered a portion of the entire written description of this invention.

The chain slider preferably consists of two asymmetrical outer components, each having a hole on one end, along with additional identical inner components, which can be added to the outer components to allow for adjustability, totaling four pieces in a completed assembly. The body assembly, preferably two pieces, is the foundation of the finished chain slider product, and the inserts allow for adjustability in the inner diameter opening to accommodate different sized chains.

Different size inserts allow for the adjustment of the inner open diameter of the chain slider to the appropriate size to function best for the application. For example, an thinner insert will yield a larger inner open diameter and will support a larger size chain and/or more chains. Alternatively, a thicker insert will yield a smaller inner open diameter and will be better suited to support a smaller sized chain and/or number of chains. For a large sized chain or large number of chains, the chain slider can be used without any inserts at all, allowing for a maximum inner open diameter.

In one embodiment, the chain slider body assembly is comprised of two components that join together by the method of a dovetail joint. The inner and outer joining components preferably unite using the method of a slide lock system (outer being the male and inner female). Two body assembly sections are preferred for functionality of the chain slider. The inner inserts are optional but may be required for suitable usage with smaller chain, wire rope, synthetic rope, line, and the like.

The chain slider is suitable for applications that entail vertical or horizontal sliding attachment points. In one embodiment, there may be a maximum preferred inner diameter of approximately ten millimeters.

The chain slider body assembly may use two identical or nearly identical halves to make a complete functioning unit. Use of the insert assembly requires the two outer halves of the body assembly plus two identical insert halves that are configured to match the desired open inner diameter. The inner and outer components may also be identical or very similar in shape. This permits fewer parts and helps to prevent improper assembly.

The chain slider parts are preferably manufactured via injection molding. Injection molding may requires a mold that is machined from aluminum to match the shape of the finished product. Any future changes made after the mold has been manufactured may require a new mold. Preferred materials include plastic, polymer, self-lubricated plastic, or self-lubricated polymer. In some instances, the injection molding process may result in size discrepancies between the mold size and the finished parts, since certain types of plastics have a tendency to shrink when they are cooled. Accordingly, in a preferred embodiment of the disclosure, tooling may be configured to provide for injection molds for parts that are slightly larger than the end product components that are desired. In this way, when the injection molded parts are fully cooled and slightly smaller in size than the original mold, the full assembly of the chain slider parts will achieve tight tolerances.

Turning now to the drawings, FIG. 1 illustrates one embodiment of the chain slider 10. Chain slider 10 preferably comprises outer body assembly 20 and may include optional insert assembly 40. Body assembly 20 may include a handle 12 and attachment opening 14. Handle 12 allows for increased maneuverability of chain slider 10 while in use, and attachment opening 14 allows for chain slider 10 to be connected with other components via the use of carabiners or similar devices. In the illustrated embodiment, handle 12 and attachment opening 14 are configured to align together, however, other configurations of handle size, attachment opening location, and number of attachments are anticipated. Other embodiments of chain slider 10 may not include handle 12 or attachment opening 14.

Figure 2:
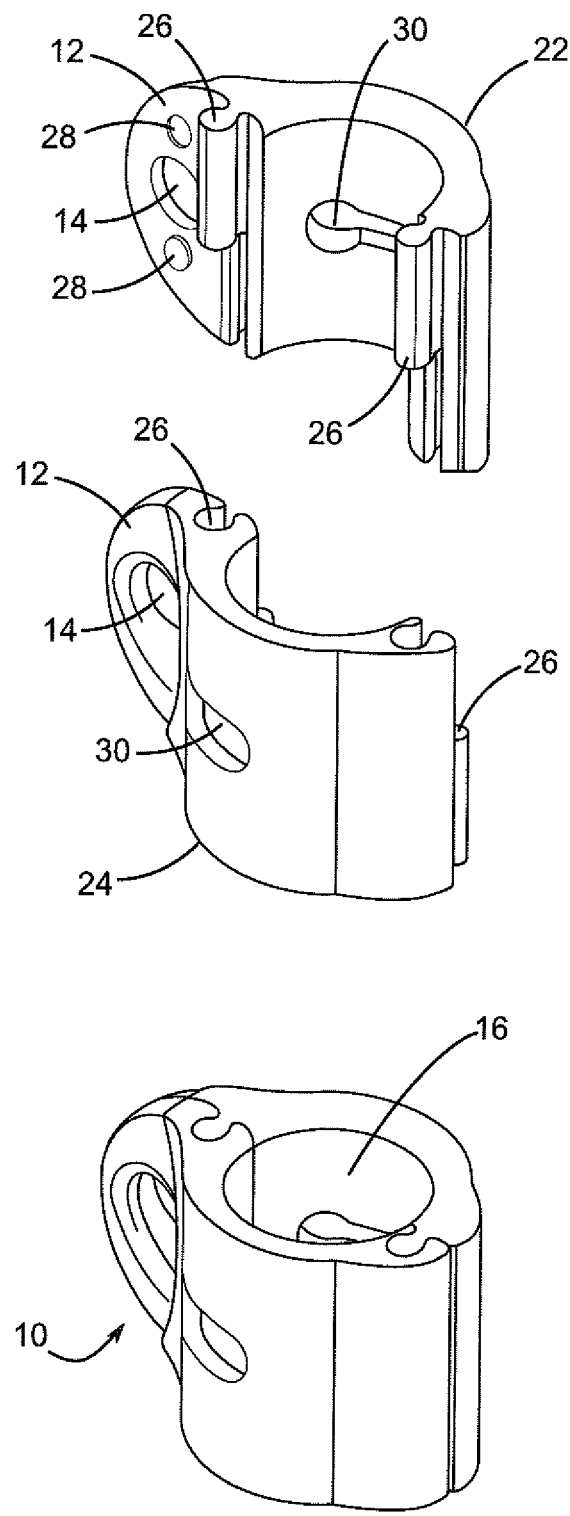
FIG. 2 shows the body assembly of the chain slider, illustrating how the component pieces of the body assembly attach together.

FIG. 2 shows the body assembly 20 broken up into first body portion 22 and second body portion 24, and then fully assembled. In the preferred embodiment, first body portion 22 is joined with second body portion 24 through dovetail joint 26. The dovetail joint 26 of the first body portion 22 slidingly engages with the dovetail joint of the second body portion 24 to form body assembly 20. First body portion 22 is considered to be fully joined to second body portion 24 when the male portions of dovetail joints 26 of first body portion 22 engage with the male portions of dovetail joints 26 of second body portion 24. The joining of first body portion 22 with second body portion 24 may be further reinforced through the use of one or more lock studs 28 in handle 12. First body portion 22 may have a male lock stud 28 configured to join with a corresponding female lock stud in second body portion 24 when the two body portions are assembled. In this illustrated embodiment, body assembly 20 does not contain any inserts, allowing for a maximum inner diameter 16, and chain slider 10 is ready to be used in this configuration.

Figure 3:
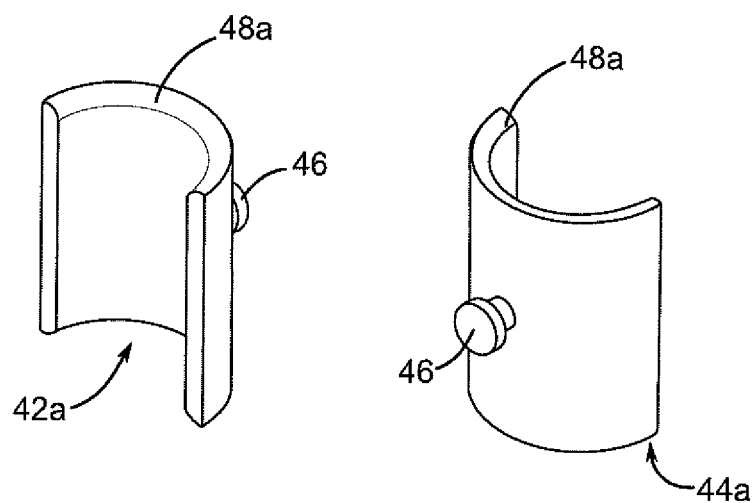
FIG. 3 shows a large sized insert of the chain slider.
Figure 4:
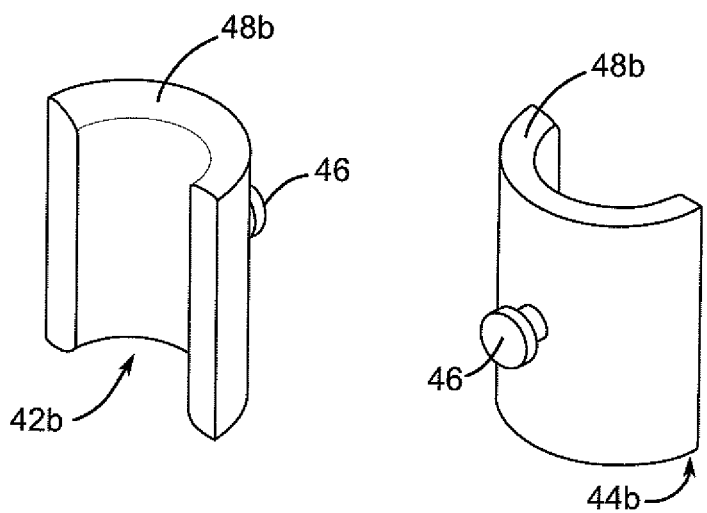
FIG. 4 shows a medium sized insert of the chain slider.
Figure 5:
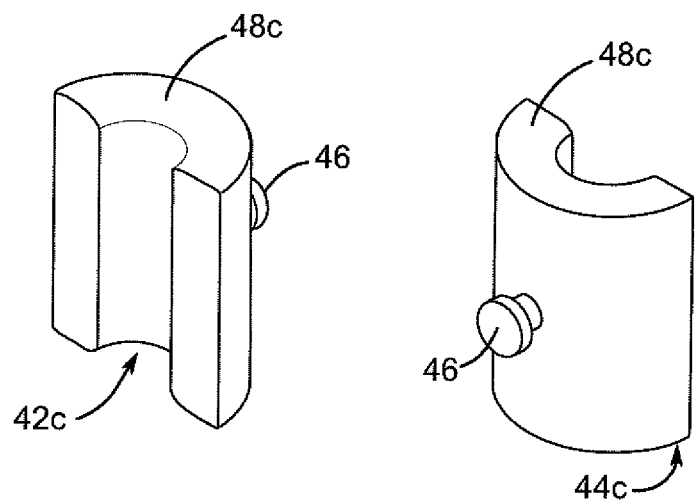
FIG. 5 shows a small sized insert of the chain slider.

FIGS. 3-5 illustrate preferred embodiments of chain slider 10 inserts. Inserts may be used with chain slider 10 in order to reduce the size of inner diameter 16 and allow chain slider 10 to be safely used with different sizes or amounts of chain or rope. Each insert is preferably comprised of a first insert portion 42 and second insert portion 44. Each insert portion 42, 44 is configured to removably attach to either of first body portion 22 or second body portion 24, such that inner open diameter 16 of chain slider 10 is adjusted to a desired size. In a preferred embodiment, each insert portion 42, 44 includes a male slide lock peg 46 that is configured to engage female slide lock channel 30 of body portions 22, 24 (see FIG. 2).

In a preferred embodiment, first insert portion 42 is identical to second insert portion 44 of the same thickness 48. Identical insert portions reduce the cost of production and replacement, and also reduce the chances of improper assembly by an end user.

FIG. 3 illustrates an example of a large sized insert, meaning that insert portions 42a, 44a have a smaller thickness 48a relative to other inserts. Smaller thickness 48a will produce a larger inner open diameter 16 in fully assembled chain slider 10. If a medium sized inner open diameter 16 is desired, then insert portions 42b, 44b having medium thickness 48b may be utilized, as shown in FIG. 4. Continuing this trend, if a small sized inner open diameter 16 is desired, insert portions 42c, 44c having greater thickness 48c may be utilized, and shown in FIG. 5. It is anticipated that insert portions 42, 44 of any thickness 48 can be made. However, for practical purposes, it is anticipated that inserts of two or three different thicknesses will be used with chain slider 10, corresponding to different sizes of open inner diameter 16 that are commonly desired by a specific industry. For example, chain slider 10 can be configured to engage 11 mm chain without any inserts, 9 mm chain with a large (thin) insert, 7 mm chain with a medium insert, and 5 mm chain with a small (thick) insert.

Figure 6:
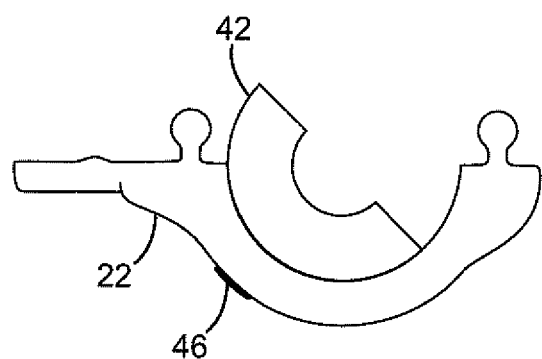
FIG. 6 illustrates one part of the small insert engaging with one part of the body assembly.
Figure 7:
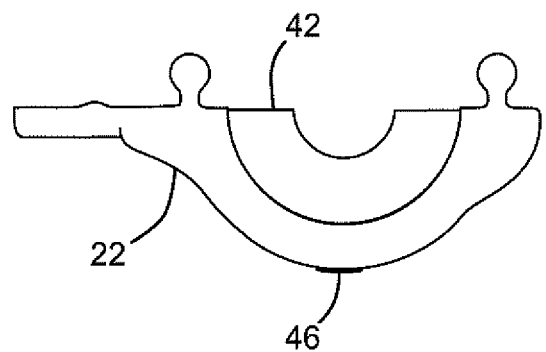
FIG. 7 illustrates the insert and body component of FIG. 6 with the small insert fully engaged.
Figure 8:
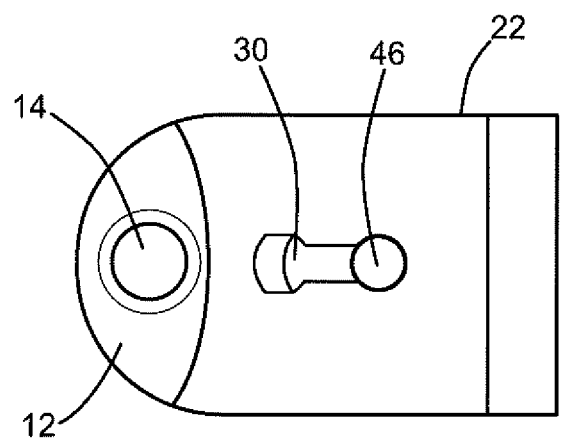
FIG. 8 is a picture of another angle of FIG. 7 showing one part of the small insert fully engaged with one part of the body assembly.

Turning to FIGS. 6-8, illustrated is a preferred embodiment of a method of joining a insert 42, 44 to body assembly portion 22, 24. Insert lock peg 46 is inserted into a larger opening of lock channel 30, and then rotates forty-five degrees such that lock peg 46 securely locks into lock channel 30 and insert 42, 44 aligns evenly with body assembly portion 22, 24. The convex portion of insert 42, 44 fits into the concave portion of body assembly portion 22, 24, and the edges of insert 42, 44 align with the edges of body assembly portion 22, 24, such that, when body assembly portion 22 with insert 42 is engaged with body assembly portion 24 with insert 44, the edges of insert 42 align with the edges of insert 44 such that there are no gaps between the inserts in insert assembly 40 (as shown in FIG. 1).

The present invention contemplates that many changes and modifications may be made. Therefore, while the presently-preferred form of the system has been shown and described, and several modifications and alternatives discussed, persons skilled in this art will readily appreciate that various additional changes and modifications may be made without departing from the spirit of the invention, as defined and differentiated by the following claims.

SEQUENCE LISTING

Not Applicable

What is claimed is:
1. A chain slider, comprising:
a body assembly having a first piece having an inner surface and a second piece having an inner surface, the first piece removably coupled to the second piece such that the first piece and second piece combine to provide an inner surface of the body assembly bordering a first longitudinal opening extending through the body assembly; and, a first insert portion having an inner surface, the first insert portion configured to removably attach to the inner surface of the first piece of the body assembly, a second insert portion having an inner surface, the second insert portion configured to removably attach to the second piece of the body assembly, wherein the first insert portion and the second insert portion combine to provide an inner surface bordering a second longitudinal opening having a diameter smaller than a diameter of the first longitudinal opening, the second longitudinal opening extending through the body assembly, the second longitudinal opening having a diameter configured to receive a chain, cable or rope such that the body assembly slides over the chain, cable, or rope; and, wherein said first piece of said body assembly has a lock channel configured to receive a key portion extending from said first insert portion.

2. The chain slider of claim 1, wherein said body assembly further comprises a handle.

3. The chain slider of claim 2, wherein said handle further comprises an attachment point for receiving a carabiner.

4. The chain slider of claim 1, where said first insert portion is identical to said second insert portion.

5. The chain slider of claim 1, wherein said first piece of said body assembly is coupled to said second piece of said body assembly via a dovetail joint.

6. The chain slider of claim 1, wherein said body assembly is generally cylindrical in shape.

7. A chain slider, comprising:
a body assembly having a first piece having an inner surface and a second piece having an inner surface, the first piece removably coupled to the second piece wherein the first piece and second piece together provide an inner surface of the body assembly bordering a first longitudinal opening extending through the body assembly, wherein said first piece of said body assembly is coupled to said second piece of said body assembly via a dovetail joint; and, a first insert portion having an inner surface, the first insert portion configured to removably attach to the inner surface of the first piece of the body assembly, wherein said first piece of said body assembly has a lock channel configured to receive a key portion extending outward from said first insert portion, a second insert portion having an inner surface, the second insert portion configured to removably attach to the second piece of the body assembly, wherein said second piece of said body assembly has a lock channel configured to receive a key portion extending outward from said second insert portion, wherein the first insert portion and the second insert portion together provide an inner surface bordering a second longitudinal opening having a diameter smaller than a diameter of the first longitudinal opening, the second longitudinal opening extending through the body assembly, the second longitudinal opening having a diameter configured to receive a chain, cable or rope such that the body assembly slides over the chain, cable, or rope; and, a handle disposed on the body assembly, the handle having an attachment point configured to receive a carabiner.

8. The chain slider of claim 7, where said first insert portion is identical to said second insert portion.

9. The chain slider of claim 7, wherein said body assembly is generally cylindrical in shape.

10. A kit for a chain slider, comprising:
a body assembly having a first piece having an inner surface and a second piece having an inner surface, the first piece removably coupled to the second piece wherein the first piece and second piece together provide an inner surface of the body assembly bordering a first longitudinal opening extending through the body assembly;

a first insert portion having an inner surface, the first insert portion configured to removably attach to the inner surface of the first piece of the body assembly, a second insert portion having an inner surface, the second insert portion configured to removably attach to the second piece of the body assembly, wherein the first insert portion and the second insert portion together provide an inner surface bordering a second longitudinal opening having a diameter smaller than a diameter of the first longitudinal opening, the second longitudinal opening extending through the body assembly, the second longitudinal opening having a diameter configured to receive a chain, cable or rope such that the body assembly slides over the chain, cable, or rope;

a third insert portion having an inner surface, the third insert portion configured to removably attach to the inner surface of the first piece of the body assembly, a fourth insert portion having an inner surface, the fourth insert portion configured to removably attach to the second piece of the body assembly, wherein the third insert portion and the fourth insert portion together provide an inner surface bordering a third longitudinal opening having a diameter smaller than a diameter of the first and second longitudinal openings, the third longitudinal opening extending through the body assembly, the third longitudinal opening having a diameter configured to receive a chain, cable or rope such that the body assembly slides over the chain, cable, or rope.

11. The kit for a chain slider of claim 10, wherein said body assembly further comprises a handle.

12. The kit for a chain slider of claim 11, wherein said handle further comprises an attachment point for receiving a carabiner.

13. The kit for a chain slider of claim 10, wherein said first piece of said body assembly is coupled to said second piece of said body assembly via a dovetail joint.

14. The kit for a chain slider of claim 10, wherein said first piece of said body assembly has a lock channel configured to receive a key portion extending out from said third insertion portion.

15. The kit for a chain slider of claim 10, wherein said body assembly is generally cylindrical in shape.

* * * * *